J. H. HERTNER.
PROTECTING MEANS FOR DYNAMO ELECTRIC MACHINES.
APPLICATION FILED JUNE 5, 1918.

1,336,520.

Patented Apr. 13, 1920.

Inventor:
John H. Hertner
By Thurston & Knox
attys

UNITED STATES PATENT OFFICE.

JOHN H. HERTNER, OF LAKEWOOD, OHIO, ASSIGNOR, BY MESNE ASSIGNMENTS, TO THE HERTNER ELECTRIC COMPANY, OF CLEVELAND, OHIO, A CORPORATION OF OHIO.

PROTECTING MEANS FOR DYNAMO-ELECTRIC MACHINES.

1,336,520.            Specification of Letters Patent.      Patented Apr. 13, 1920.

Application filed June 5, 1918. Serial No. 238,261.

*To all whom it may concern:*

Be it known that I, JOHN H. HERTNER, a citizen of the United States, residing at Lakewood, in the county of Cuyahoga and State of Ohio, have invented a certain new and useful Improvement in Protecting Means for Dynamo-Electric Machines, of which the following is a full, clear, and exact description.

This invention relates to dynamo electric machines, particularly those having shunt field windings, and has for its chief object to provide improved protecting or controlling means which prevent destruction of, or injury to the shunt field coils when the machine is run on an open circuit, and which quickly and properly restore the field circuit to normal condition when the machine is connected to the load.

The invention has particular utility in shunt generators which have a substantially constant current output, such as are used for motion picture work and battery charging purposes, and it resides particularly in a resistance controlling device by which a resistance is cut into the field circuit when the voltage across the field terminals becomes excessive, and which positively and quickly cuts out the resistance when the voltage is decreased as when the load is thrown on the machine.

The invention may be briefly summarized as consisting in certain novel details of construction and combinations and arrangements of parts which will be described in the specification and set forth in the appended claims.

Figure 1:
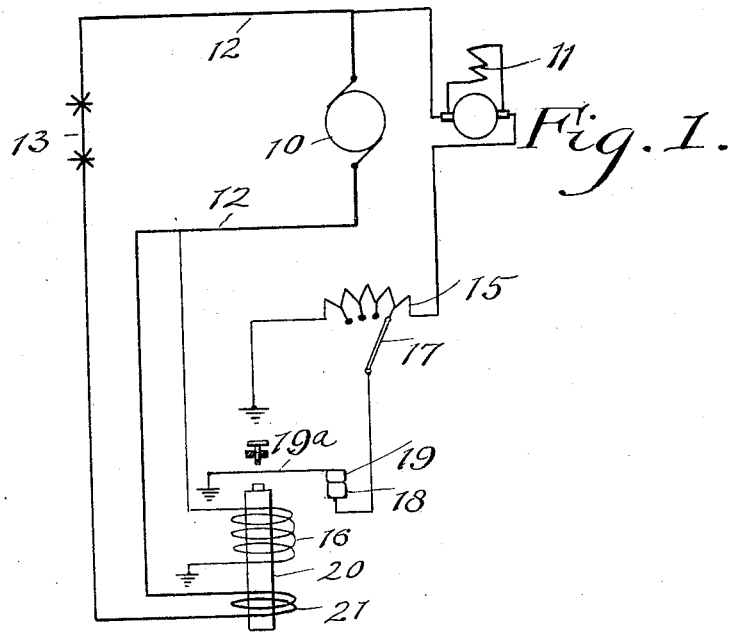
Figure 2:
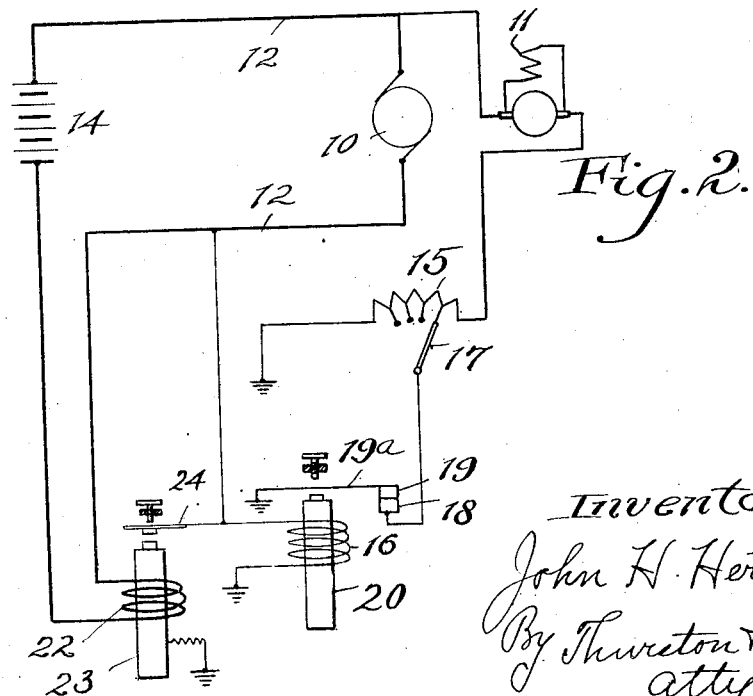

In the accompanying sheet of drawings, Figure 1 is a diagrammatic view showing my invention in one of its forms; Fig. 2 is a similar view showing my invention in a different form.

In the drawings I have shown a shunt generator having an armature 10 and a shunt field winding 11, Fig. 1 showing load conductors 12 connected to a load, consisting in this case of one or more arc lamps 13; and Fig. 2 showing the load conductors connected to a battery 14 which is to be charged by the generator. The apparatus or system shown in Fig. 1 is particularly adapted for motion picture work to furnish the light for projection purposes, and the apparatus or system shown in Fig. 2 is particularly adapted as a battery charging outfit. I wish to make clear, however, at this point, that while reference has been made particularly to a machine for two purposes or uses, my invention doubtless has utility for dynamo electric machines used for other purposes.

It is a well known fact that ordinarily the open circuit voltage of a shunt generator is much higher than the closed circuit voltage, and that if the generator is allowed to run on open circuit, the shunt field coils may be entirely burned out or seriously injured. The generator which I have developed for motion picture work must be able to operate at a voltage of from 40 to 110 without a material change in current value. Such being the case the machine must have a constant current characteristic which with normal field resistance necessitates an open circuit voltage of between 200 and 250 volts. Such a voltage would speedily burn out the shunt field coils unless the coils contain an inordinate amount of wire, since the energy to be dissipated under such conditions is likely to be from four to six times that when operating under full load conditions.

To avoid injury or destruction to the field coils when the machine is operated under open circuit, I have provided in the shunt field circuit a resistance 15 and the coil 16 of a solenoid designed to cut the resistance into the field circuit when the voltage rises, or when the field current reaches a predetermined value. This resistance reduces the open circuit voltage and the field current to a safe maximum value.

I prefer to use as the resistance element the field rheostat of the machine. As here shown, one end of the total resistance of the rheostat is connected to one terminal of the shunt field winding, and the other end of the resistance is grounded. The rheostat has an adjustable arm 17 through which the resistance normally in the field circuit may be increased or decreased, and in this case the solenoid is utilized to cut into or out of the field circuit the balance of the rheostat resistance which is normally not in the field circuit. To this end I provide a solenoid controlled switch including a stationary contact 18 which is connected to the adjustable arm 17 of the rheostat and a second contact 19 carried by a movable switch blade or lever 19ª which is grounded, and the solenoid is so arranged that its plunger 20 will separate the contacts by the upward magnetic pull when the current through the solenoid coil reaches a certain value. It will be observed also that in this case one terminal of the coil 16 is grounded and the other terminal is connected to one of the load conductors 12 of the generator so that normally the shunt field circuit is from one load conductor or terminal of the generator through the shunt field winding, through that part of the resistance which is normally in the circuit, across the contacts 18 and 19, through the solenoid coil 16 and to the opposite load circuit and terminal of the generator.

Suppose the machine is operating on an open circuit as when the generator is first started, the shunt field begins to build up, and as soon as the voltage of the generator reaches a predetermined point which is slightly higher than the voltage when operating under full load, the pull of the solenoid is strong enough to raise the plunger, which strikes the lever 19ª carrying the movable contact 19 of the solenoid switch. This opens the normal field circuit and cuts in the entire resistance of the field rheostat, whereupon the open circuit voltage in place of rising to the value of about 200 to 250 volts, is reduced to a value less than the maximum voltage under load conditions. At this value the magnetic pull is, however, still enough to hold up the plunger of the solenoid and to maintain the resistance in the shunt field circuit.

If the operator now throws the load onto the generator, the voltage is necessarily reduced. This would ordinarily allow the plunger to drop, cutting out the resistance and permitting current to be supplied to the load with the generator field at its normal strength. But it is often the case that due to improper manipulation or adjustment of the solenoid by unskilled or perniciously active employees or operators, or due to residual magnetism of the frame of the solenoid, the plunger of the solenoid does not drop when the voltage is reduced on throwing on the load. To avoid this difficulty I provide the solenoid with a second coil 21 which is preferably in the load circuit so that as soon as current is traversing the load circuit the plunger is positively pulled down without relying upon the weakening of the field created by coil 16. In consequence, the abnormal or protective resistance previously inserted in the field circuit by the solenoid is instantly cut out of the circuit.

The arrangement shown in Fig. 1 is very satisfactory for machines designed to supply to the load current of considerable value, especially when the load consists of one or more arc lights, as when the machine is used for moving picture work. But when the machine is used for battery charging purposes, and when the battery is thrown into the circuit, the current which actually passes through the load circuit may be so small that sufficient pull may not be exerted on the solenoid plunger or core by a coil, such as shown at 21 in Fig. 1, to insure quick restoration of the plunger to normal position.

To meet the requirements created by conditions such as explained above, as when the storage battery constitutes the load of the generator, I provide in the load circuit (see Fig. 2) a coil 22, this coil forming a part of a separate solenoid, having a plunger 23 designed to engage a contact 24 and to short circuit the solenoid coil 16 when the load is thrown on the circuit. This arrangement quickly deënergizes the solenoid coil 16 regardless of how little current is passing through the load circuit and regardless of the direction of the current. Except for the substitution of the parts 22, 23 and 24 for the coil 21, the system shown in Fig. 2 is like that shown in Fig. 1.

With the arrangement shown in either Fig. 1 or Fig. 2, proper protection is given to the field circuit, and at the same time there is no danger of the abnormal resistance being left in the field circuit after the load is thrown onto the generator.

While I have shown a resistance for preventing abnormal current passing through the field circuit, and a magnet in the form of a solenoid, with its coil in the field circuit for cutting the resistance into the circuit, and have shown two ways for restoring the solenoid plunger or core to normal position, other ways and means may be utilized for carrying out the principle of my invention, and I do not wish to be confined to the precise details or arrangements shown, but aim in my claims to cover all modifications which do not involve a departure from the spirit and scope of my invention in its broadest aspects.

Having described my invention, I claim:

1. The combination with a dynamo electric machine having a shunt field circuit, of magnetically operated means for preventing excessive current passing through the field coils when the machine is on open circuit, and magnetically operated means for throwing said preventing means out of action when current is passing through the load circuit.

2. In combination with a dynamo electric machine having a shunt field circuit, means for protecting the field circuit comprising a resistance for reducing the voltage of the generator, means for inserting the resistance in the field circuit comprising a magnet coil and a movable member actuated thereby, and magnetically operated means for causing the resistance to be cut out of the circuit.

3. In combination with a generator having a shunt field circuit, of a resistance and a coil in the shunt field circuit for preventing abnormal increase of voltage when the generator is on open circuit, and means comprising a separate coil for causing the resistance to be cut out of action when a load is thrown on the generator.

4. In combination with a generator having a shunt field circuit and a load circuit, of means for preventing excessive rise of voltage when the machine is operated on open circuit, said means comprising a resistance designed to be cut into the field circuit, and a solenoid comprising a plunger and a coil for moving the plunger to cut the resistance into the field circuit, and magnetically operated means for rendering said coil ineffective for holding the plunger in the position to which it was moved when the resistance was cut into the field circuit.

5. In combination with a generator having a shunt field circuit and a load circuit, means for protecting the shunt field coils comprising a resistance and a solenoid for cutting the resistance into the field circuit and comprising a core and a coil in the field circuit, and means comprising a coil in the load circuit for causing the plunger to be shifted to normal position when current is passing through the load circuit.

In testimony whereof, I hereunto affix my signature.

JOHN H. HERTNER.